United States Patent
Muhlhoff et al.

(10) Patent No.: US 11,912,074 B2
(45) Date of Patent: Feb. 27, 2024

(54) METHOD FOR EXPLOITING PRESSURE AND TEMPERATURE MEASUREMENTS OF A VEHICLE TIRE

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Arnaud Delbast, Clermont-Ferrand (FR); Aurelien Fabre, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 750 days.

(21) Appl. No.: 16/610,969

(22) PCT Filed: May 7, 2018

(86) PCT No.: PCT/FR2018/051145
§ 371 (c)(1),
(2) Date: Nov. 5, 2019

(87) PCT Pub. No.: WO2018/203021
PCT Pub. Date: Nov. 8, 2018

(65) Prior Publication Data
US 2020/0070596 A1    Mar. 5, 2020

(30) Foreign Application Priority Data

May 5, 2017   (FR) ........................................ 1753978

(51) Int. Cl.
*B60C 23/04* (2006.01)
*B60C 23/06* (2006.01)
(Continued)

(52) U.S. Cl.
CPC ...... *B60C 23/0484* (2013.01); *B60C 23/0474* (2013.01); *B60C 23/06* (2013.01);
(Continued)

(58) Field of Classification Search
CPC . B60C 23/0484; B60C 23/0474; B60C 23/06; B60C 23/04; B60W 40/12;
(Continued)

(56) References Cited

U.S. PATENT DOCUMENTS

| 4,893,110 A | 1/1990 | Hebert |
| 5,895,846 A * | 4/1999 | Chamussy .......... B60C 23/0408 |
| | | 73/146.2 |

(Continued)

FOREIGN PATENT DOCUMENTS

| CN | 106143011 A | * 11/2016 |
| CN | 206171054 U | * 5/2017 |

(Continued)

OTHER PUBLICATIONS

Alina Moore, "Tire Guide," TopsSpeed.com (https://www.topspeed.com/cars/tire-guide-ar10406.html), published Jun. 14, 2006. (Year: 2006).*

(Continued)

*Primary Examiner* — Donald J Wallace
*Assistant Examiner* — Daniel M. Robert
(74) *Attorney, Agent, or Firm* — VENABLE LLP

(57) ABSTRACT

A method for processing inflation defects of a tyre of a vehicle is disclosed, the tyre being equipped with sensors for measuring the pressure and the temperature of the internal cavity of said tyre. The pressure and the temperature of the internal cavity of the tyre are measured periodically and, as soon as an inflation defect of a tyre is detected, an alert is signalled to the driver of the vehicle, in which there is also transmitted to the driver of the vehicle a maximum speed (Continued)

setpoint: which, when the measured inflation pressure of the tyre is greater than or equal to a first inflation pressure threshold value $p_1$, is a first maximum speed setpoint value $V_1$; and which, when the measured inflation pressure of the tyre is less than said first pressure threshold value $p_1$ and greater than or equal to a second pressure threshold value $p_2$, decreases as a function of said measured inflation pressure of the tyre.

16 Claims, 3 Drawing Sheets

(51) Int. Cl.
*B60W 40/12* (2012.01)
*B60W 50/038* (2012.01)
*G01N 23/18* (2018.01)
*B60W 50/029* (2012.01)
*B60W 50/14* (2020.01)

(52) U.S. Cl.
CPC .......... *B60W 40/12* (2013.01); *B60W 50/038* (2013.01); *G01N 23/185* (2013.01); *B60W 2050/0295* (2013.01); *B60W 2050/143* (2013.01)

(58) Field of Classification Search
CPC ....... B60W 50/038; B60W 2050/0295; B60W 2050/143; B60W 2050/021; B60W 2520/10; B60W 2530/20; B60W 2720/10; B60W 30/143; B60W 30/146; B60W 50/14; B60W 50/0205; B60W 50/029; G01N 23/185; B60T 2240/00; B60T 2240/03
See application file for complete search history.

(56) References Cited

U.S. PATENT DOCUMENTS

| | | | |
|---|---|---|---|
| 6,039,099 A * | 3/2000 | Muhlhoff | B60C 17/10 |
| | | | 152/158 |
| 6,868,358 B2 | 3/2005 | Brown, Jr. | |
| 7,159,454 B2 | 1/2007 | Tatraux-Paro et al. | |
| 2002/0024432 A1 * | 2/2002 | Lin | B60C 23/0401 |
| | | | 340/447 |
| 2002/0126005 A1 * | 9/2002 | Hardman | B60C 23/0493 |
| | | | 340/447 |
| 2002/0193932 A1 | 12/2002 | McCurdy | |
| 2003/0033072 A1 * | 2/2003 | Nantz | B60T 8/172 |
| | | | 123/352 |
| 2003/0159767 A1 * | 8/2003 | Riva | B60C 15/028 |
| | | | 29/894.31 |
| 2004/0017289 A1 * | 1/2004 | Brown, Jr. | B60C 23/0408 |
| | | | 340/442 |
| 2006/0086183 A1 | 4/2006 | Tatraux-Paro et al. | |
| 2006/0232391 A1 * | 10/2006 | Nakatani | B60C 23/0408 |
| | | | 340/447 |
| 2007/0255475 A1 * | 11/2007 | Dagh | B60T 8/885 |
| | | | 303/148 |
| 2009/0030581 A1 * | 1/2009 | Pollklas | B60C 23/00 |
| | | | 701/50 |
| 2012/0109449 A1 * | 5/2012 | Boehme | B60C 23/0476 |
| | | | 73/146.2 |
| 2015/0061852 A1 * | 3/2015 | Fu | B60C 23/0488 |
| | | | 340/442 |
| 2018/0080399 A1 * | 3/2018 | Jun | F02D 41/12 |

FOREIGN PATENT DOCUMENTS

| | | | | |
|---|---|---|---|---|
| DE | 102008062074 B4 * | 6/2015 | .......... | B60C 23/003 |
| EP | 0315885 A1 | 5/1989 | | |
| EP | 0 786 361 A1 | 7/1997 | | |
| EP | 1650543 A2 | 4/2006 | | |
| EP | 2130690 A2 * | 12/2009 | .......... | B60C 17/0009 |
| EP | 2922713 B1 * | 8/2017 | .......... | B60C 11/246 |
| FR | 2998514 A1 * | 5/2014 | .......... | B60C 11/246 |
| JP | 2006011981 A * | 1/2006 | | |
| KR | 20140032681 * | 3/2014 | | |

OTHER PUBLICATIONS

James Lemmex, "Comment 1," In News from Notch Consulting, Inc. (https://notchconsulting.blog/2008/02/10/conti-rolls-out-contiseal-self-sealing-tires-as-an-alternative-to-run-flats/), published Apr. 29, 2010. (Year: 2010).*

International Search Report dated Jul. 23, 2018, in corresponding PCT/FR2018/051145 (4 pages).

* cited by examiner

METHOD FOR EXPLOITING PRESSURE AND TEMPERATURE MEASUREMENTS OF A VEHICLE TIRE

FIELD OF THE INVENTION

The present invention relates to a method for exploiting measurements from a system monitoring the tyres of a vehicle. More particular, it relates to the use of the measurements made on the tyres in order to monitor their state when rolling.

STATE OF THE ART

Knowledge of the inflation pressures of the tyres is not sufficient to give the driver of a vehicle reliable and useful information. Permanently watching these indications risks being tedious rather than actually useful. Indeed, the measurements of pressure and/or temperature of the inflation gas of the internal cavity of the tyres vary enormously while rolling because of the heating due to the hysteretic losses of the mixtures of the components, of the influence of the heat given off by the brakes and of the load transfer which provoke slight variations of volume of the tyres. This is why the usual systems for monitoring the pressure of the tyres of a vehicle, or TPMS (acronym for Tyre Pressure Monitoring Systems) more often than not simply alert the driver in case of an inflation pressure of a tyre less than a threshold such as 1.5 bar for private passenger vehicles, the minimum inflation pressure value according to the ETRTO (European Tyre and Rim Technical Organisation) recommendations.

For some years, tyres comprising a layer of self-sealant product on their inner surface have been marketed. These elastic, viscous or pasty products are designed to block the holes caused by a perforating object passing through the wall of a tyre.

These self-sealant products do not make it possible to completely eliminate the risk of a flat tyre following a perforation, but they have however made it possible to significantly reduce this risk. It is also noted that a very large part of the residual leaks are slow leaks or very slow leaks which can occur over several days, even several weeks before being detected by the current tyre pressure monitoring systems TPMS.

The document EP 0 786 361 B1 proposes adding to the conventional alarms linked to the crossing of an inflation pressure threshold, for example 1.5 bar for the tyres of private passenger vehicles, an early detection of a leak of a tyre by tracking the inflation pressure differenced measured between the two tyres of one and the same axle of the vehicle. An alert is transmitted to the driver when this deviation exceeds a given threshold. This document also proposes transmitting the driver an estimation of the time remaining before the inflation pressure of the tyre concerned reaches a critical threshold.

However, this document may lead drivers to have to stop when such a stoppage is not essential.

SUMMARY OF THE INVENTION

The subject of the invention is a method for processing inflation defects of a tyre of a vehicle, the tyre being equipped with sensors for measuring the pressure and the temperature of its internal cavity, in which the pressure and the temperature of this internal cavity are measured periodically and, as soon as inflation defect of a tyre is detected, an alert is signalled to the driver of the vehicle. This method is characterized in that there is also transmitted, to the driver of the vehicle, a maximum speed setpoint:

which, when the measured inflation pressure of the tyre is greater than or equal to a first inflation pressure threshold value $p_1$, is a first maximum speed setpoint value $V_1$; and which, when the measured inflation pressure of the tyre is less than said first pressure threshold value $p_1$ and greater than or equal to a second pressure threshold value $p_2$, decreases as a function of said measured inflation pressure of the tyre.

This method thus has the advantage of providing the driver with a maximum speed setpoint to be observed which changes as a function of the measured inflation pressure of the tyre. The driver thus knows how to act following the alert which has been transmitted to him or her. Measured inflation pressure is understood to mean the last measured inflation pressure value or a mean or filtered value of the last measurements (3 to 5 for example).

The maximum authorized speed is calculated so as to ensure the conditions of safety of the driver of the vehicle linked to the tyre, it incorporates in particular the capacity specific to each type of tyre to roll at a reduced pressure without being damaged and the unseating-related performance levels of the tyres.

Preferably, the first maximum speed setpoint value $V_1$ lies between 90 and 130 km/h, very preferentially between 90 and 110 km/h.

This first maximum speed setpoint value is sufficiently high to make it possible to continue the desired journey without reaching speeds likely to abruptly increase the leak rates in the case, for example, of an expulsion of a perforated object which may be the source of the tyre inflation defect.

According to a first embodiment, when the measured inflation pressure of the tyre lies between the first pressure threshold for $p_1$ and the second pressure threshold $p_2$, the maximum speed setpoint $V_{max}$ transmitted decreases progressively between the first maximum speed setpoint value $V_1$ and a second maximum speed setpoint value $V_2$ as a function of the measured inflation pressure of the tyre.

According to a second embodiment, this reduction of the maximum speed setpoint $V_{max}$ is a reduction by speed levels as a function of the measured inflation pressure of the tyre.

Preferably, when the measured inflation pressure of the tyre is less than the second inflation pressure threshold value $p_2$, the maximum speed setpoint transmitted is zero.

The maximum speed setpoint value $V_{max}$ thus decreases as a function of the inflation pressure of the tyre concerned when this pressure lies between the two pressure threshold values $p_1$ and $p_2$, and it is only when the pressure becomes less than or equal to $p_2$ that the driver must imperatively stop. This progressive decrease in setpoint thus makes it possible to continue to roll without damage to the safety of the vehicle as far as inflation pressure values much lower than the usual alert values of the current TPMSs.

Preferably, the first pressure threshold value $p_1$ can lie between 1.5 and 2.5 bar, preferentially between 1.5 and 2 bar.

Alternatively, the first pressure threshold value $p_1$ can also be equal to the nominal inflation pressure of the tyre when cold in the case of a private passenger vehicle.

Preferably, the second pressure threshold value $p_2$ lies between the pressure of unseating of the tyre from its rim while rolling and said unseating pressure plus 0.3 bar.

The pressure of unseating of a tyre from its rim while rolling is the pressure at which this risk of a tyre bead leaving its wheel rim seat becomes significant. The second inflation pressure threshold $p_2$ must therefore be greater than this inflation pressure value and as soon as this threshold is crossed, it is vitally important to transmit to the driver an immediate vehicle stop setpoint.

Alternatively, the second pressure threshold value $p_2$ can lie between 0.5 bar and 1 bar, preferentially between 0.6 bar and 0.8 bar.

These values are greater than the unseating pressure of most of the tyres for standard private passenger vehicles.

Obviously, when the tyre comprises structural elements allowing it to roll at zero inflation pressure, for example side wall reinforcements or seats arranged in the internal cavity, when the measured inflation pressure is less than the second threshold $p_2$, the setpoint speed $V_{max}$ transmitted is the speed recommended by the manufacturer of the tyre and is of the order of 80 km/h.

The tyre inflation defects can in particular be the detection of a loss of pressure.

Another subject of the invention is a method, in which, to detect an inflation defect of the tyre:
- the inflation pressure $p_g$ and the temperature θ of the gas of the internal cavity of the tyre are recorded periodically;
- the measured pressure $p_g$ is transformed into absolute pressure $P_g$ and the temperature is transformed into absolute temperature T in kelvins, the $P_g/T$ ratio is calculated and a series of values is obtained;
- a leak is detected when the variation over time of this series of values satisfies a predetermined relationship.

Advantageously, the tyre having a given nominal inflation pressure value when cold, the pressure variation threshold Δp lies between 3 and 7% of said nominal inflation pressure value when cold.

It is perfectly possible to detect an inflation defect, such as a slow leak, well before the inflation pressure of the tyre concerned is less than an alert threshold of the current TPMSs. It is then important to alert the driver of the vehicle to the existence of a defect while allowing him or her to continue his or her journey at a limited but acceptable maximum speed.

It is also possible to detect a leak of one of the tyres of a vehicle by tracking the inflation pressure variations between two tyres of one and the same axle as proposed in the document EP 786 361 A1.

Advantageously, from the $T/P_g$ values, a linear regression is performed, the slope of the linear regression straight line is calculated, the time needed for the inflation pressure $p_g$ to drop below a critical pressure threshold is estimated and this estimation is transmitted to the driver of the vehicle.

This alert allows the driver to best manage the repairing of the tyre concerned.

It is also possible to use an estimation of the leak rate of the tyre concerned as given by the document U.S. Pat. No. 6,868,358 B2.

The inflation defect of the tyre can also be the detection of an abnormal rise in the temperature of its internal cavity.

The tyre advantageously comprises, on at least a part of its inner wall, a layer of self-sealant product.

The vehicle can also comprise an autonomous driving mode. In this case, «driver of the vehicle» is understood to mean all of the elements that allow for the autonomous driving of the vehicle.

The method according to one of the objects of the invention is particularly suited in the case of such vehicles because it has the advantage of very greatly limiting the risks of an enforced stoppage.

Definitions

The following abbreviations are used in the text of the application:
- $p_g$, relative inflation pressure of the gas of the internal cavity of a tyre;
- $P_g$, absolute inflation pressure; $P_g = p_g + p_{atm}$;
- $p_{atm}$, atmospheric pressure, equal to 101.325 kPa in standard conditions;
- θ, temperature in degrees Celsius of the gas of the internal cavity of a tyre;
- T, absolute temperature in Kelvins (degrees Celsius + 273.16);
- $T_{amb}$, ambient temperature in Kelvins;
- V, speed of the vehicle in kilometres per hour (km/h);

DESCRIPTION OF THE FIGURES

The invention is now described using the attached drawing in which.

DETAILED DESCRIPTION OF THE INVENTION

The first step of the method according to one of the objects of the invention consists in detecting an inflation defect of a tyre at the earliest possible moment.

The detection of a pressure defect can be made in different ways.

The usual TPMS systems trigger an alert when the relative inflation pressure of a tyre is measured below a predefined threshold suited to the tyre-vehicle pairing.

It is also possible to analyse the pressure variations between two tyres of one and the same axle as proposed by the document EP0786361 A1. The tracking of the pressure deviations between these two tyres makes it possible to alert the driver as soon as this deviation exceeds a given threshold. That allows for early alerts, in particular before the inflation pressure of the tyre concerned crosses the above-mentioned triggering threshold.

It is also possible to analyse the trend of the pressure of the tyres, tyre by tyre. It is then preferable to track the quantity of gas present in the internal cavity of the tyres by applying the ideal gas law as proposed in the document EP0315885 B1. The trend of the ratio between the absolute inflation pressure and the absolute temperature is then calculated. This ratio is linked to the number of moles of gas. This tracking also allows for an early detection of a leak.

Figure 1:
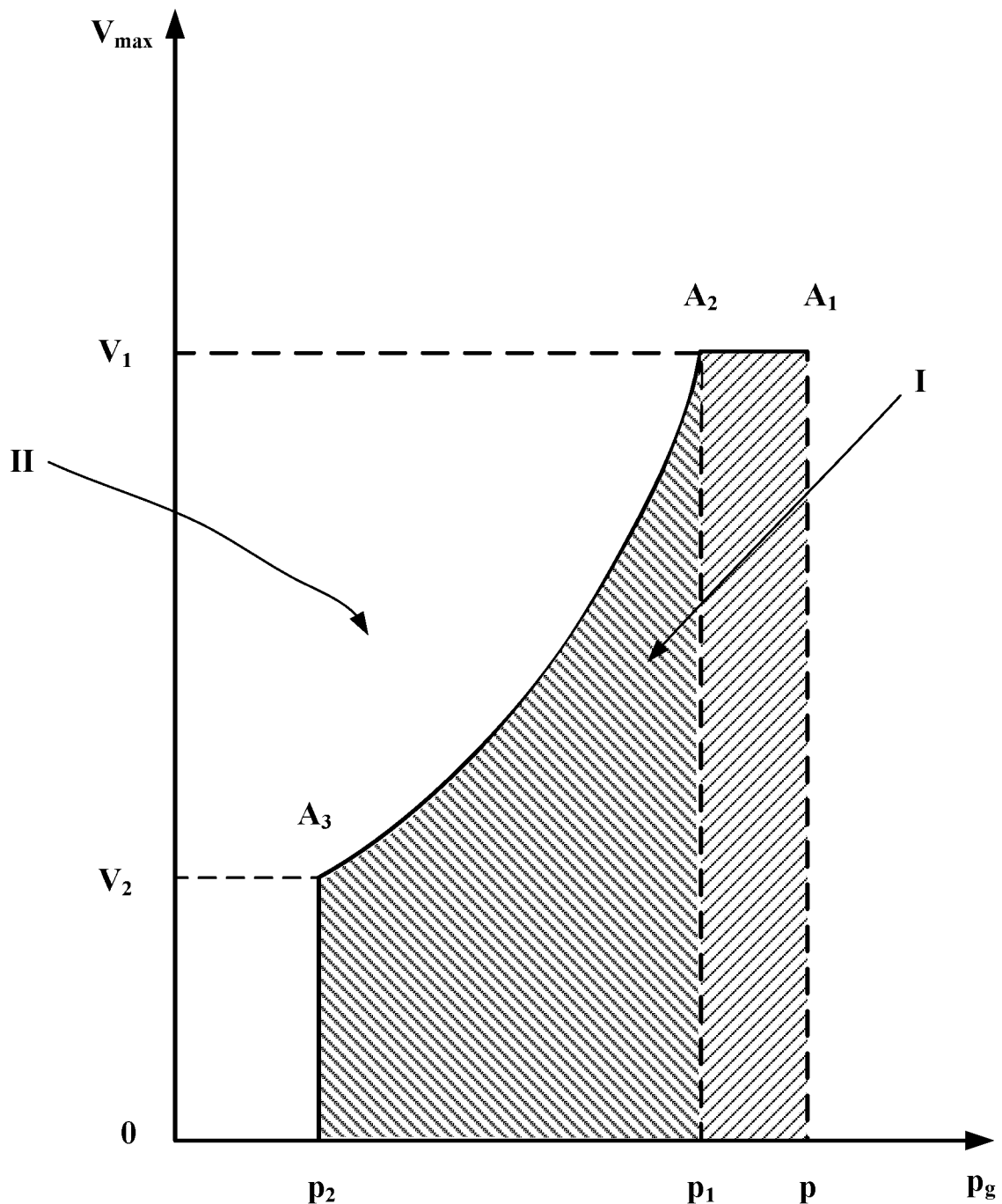
- FIG. 1 presents a first example of trend of the maximum speed setpoint in a diagram of speed as a function of inflation pressure.

FIG. 1 presents a first example of maximum speed setpoint to be transmitted to the driver of a vehicle as a function of the measured inflation pressure of one of its tyres and after the detection of an inflation defect.

At the point $A_1$, an inflation defect has been detected by one of the methods indicated previously. The measured inflation pressure of the tyre concerned is greater than the first pressure threshold $p_1$. The tyre is still in conformity with its range of operation as described by the ETRTO.

Upon the detection, an alert is transmitted to the driver of the vehicle to prompt him or her not to exceed the speed $V_1$. $V_1$ is sufficiently high to make it possible to continue his or her journey in acceptable conditions but makes it possible to limit the risks of ejection of a perforating object, if the latter is responsible for the detected leak. $V_1$ preferably lies between 130 and 90 km/h, very preferentially between 90 and 110 km/h.

At the point $A_2$, the inflation pressure corresponds to the first critical threshold $p_1$. Below this value the tyre is no longer in conformity with the recommendations of the constructor of the vehicle, even those of the ETRTO. $p_1$ is preferably equal to 1.5 bar or to the recommended inflation pressure when cold of the tyre/vehicle pairing concerned.

From this particular moment, according to the method according to one of the objects of the invention, the driver of the vehicle is allowed to continue his or her route but by prompting him or her to much more markedly reduce his or her speed to remain in good conditions of safety.

At the point $A_3$, the inflation pressure corresponds to the second critical threshold $p_2$. The maximum setpoint speed is then of the order of 50 km/h to conserve a good vehicle steering capacity.

Below this second critical pressure threshold, rolling is no longer allowed. The maximum speed setpoint transmitted is zero, or immediate stop.

Preferably, this second pressure threshold value $p_2$ lies between the pressure of unseating of the tyre from its rim while rolling and this unseating pressure plus 0.3 bar. Realistic values can lie between 0.5 and 1 bar, preferably between 0.6 bar and 0.8 bar.

The document EP1650543 A2 presents a method for determining the resistance to unseating of a tyre mounted on a rim and inflated to a predetermined pressure.

This method consists in equipping a vehicle with the tyre on a position of a steering axle; setting the vehicle in motion and stabilizing it at a predetermined speed of the order of 40 to 60 km/h; imposing, by rotation of the steering wheel, a steering wheel angle, and maintaining it for a predetermined time, the vehicle advancing at the predetermined speed such that the tyre travels a portion of its trajectory in a circular arc; repeating the preceding step by progressively increasing the steering wheel angle until at least one condition, chosen from among (i) the unseating of the tyre, or (ii) the arrival of the steering wheel of the vehicle at the end stop, is satisfied.

This method makes it possible to obtain a fine estimation of the resistance to unseating of the tyres.

In FIG. 1, the maximum speed setpoint decreases progressively between V1 and V2. The decrease being more rapid in proximity to the point $A_2$.

Figure 2:
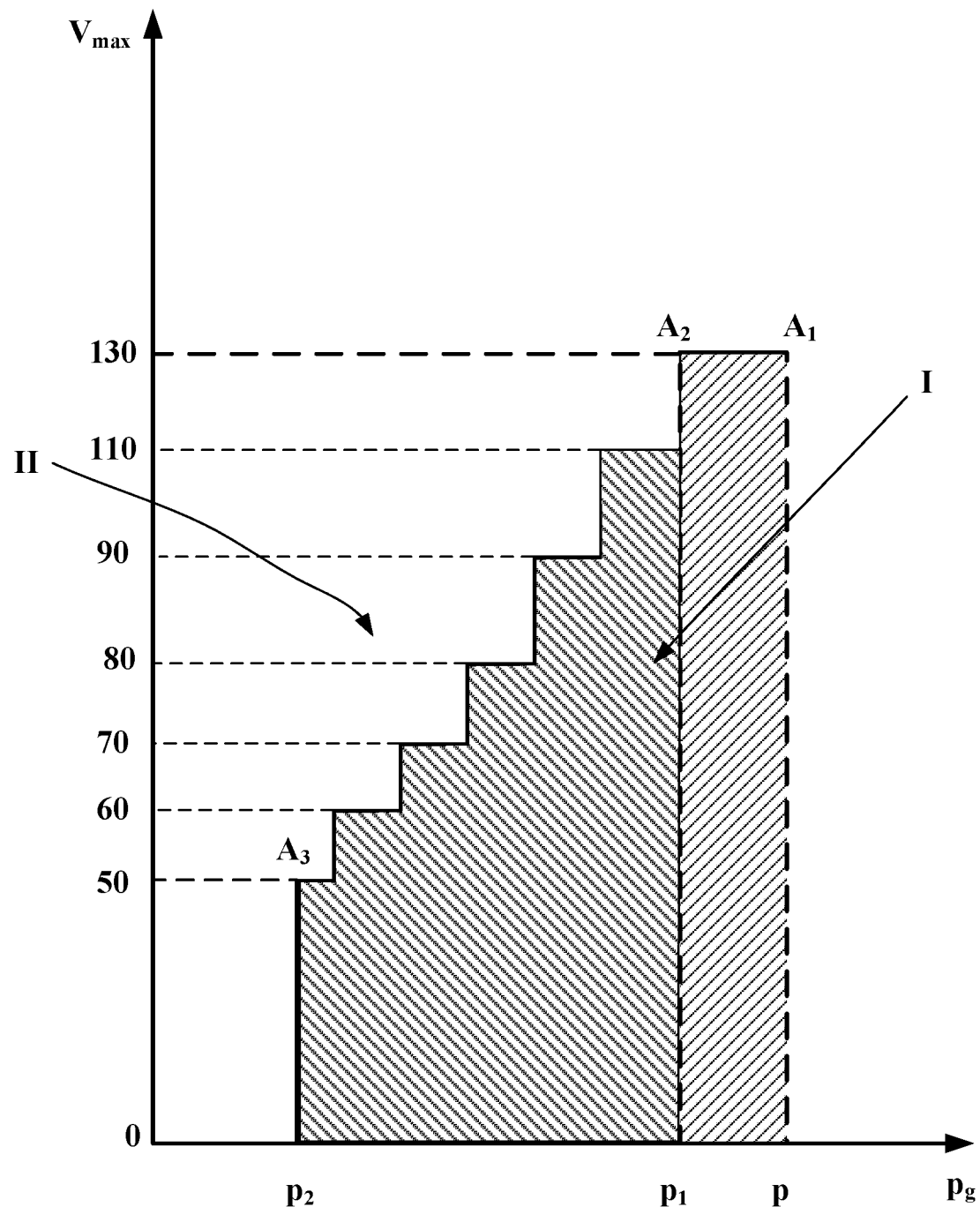
- FIG. 2 presents a second example of the trend of the maximum speed setpoint.

FIG. 2 presents a second example of a maximum speed setpoint to be transmitted to the driver of a vehicle as a function of the measured inflation pressure of one of its tyres and after the detection of an inflation defect.

In this example, the maximum speed setpoint decreases by speed levels between 130 and 50 km/h.

Figure 3:
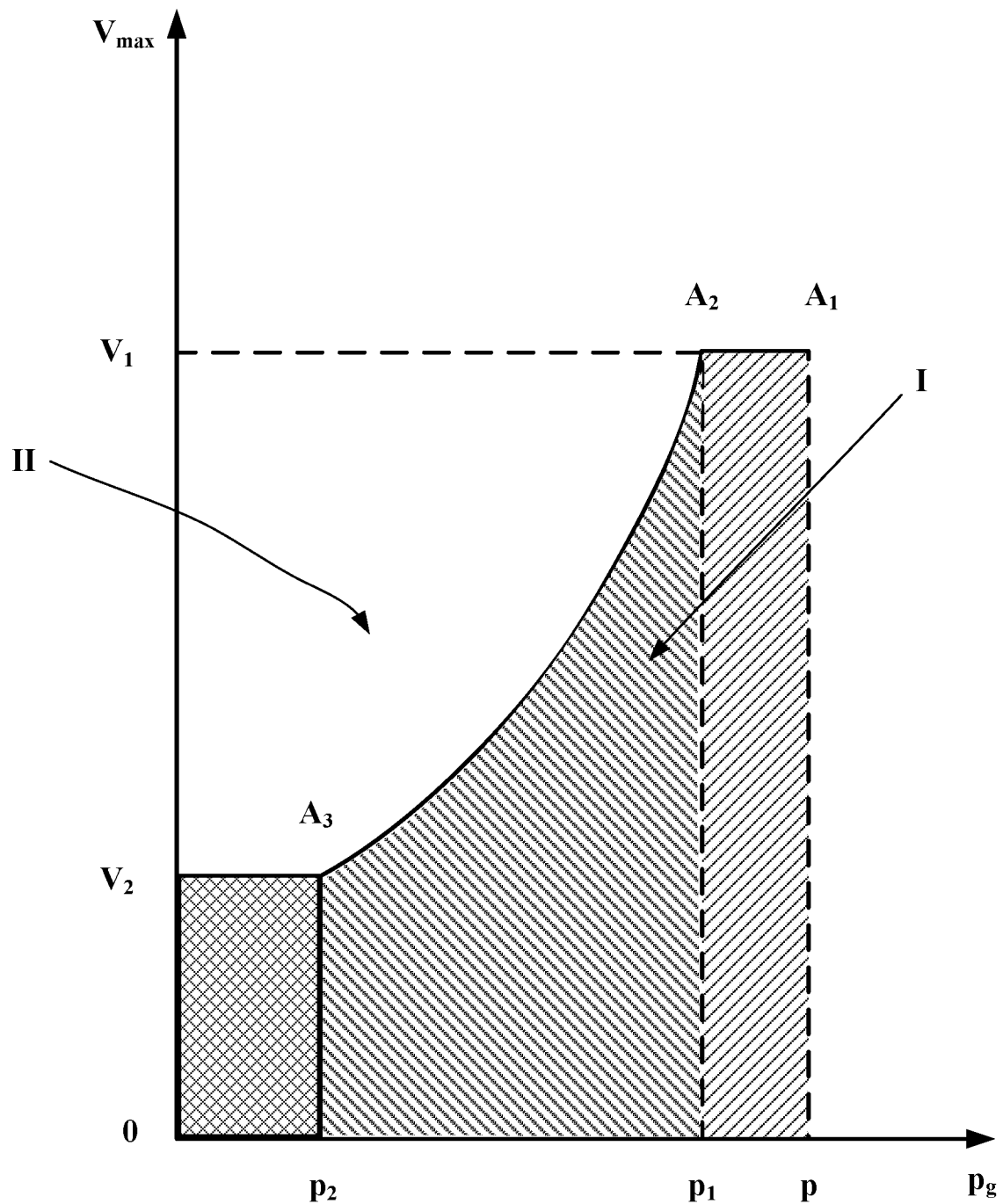
- FIG. 3 presents a trend of the maximum speed setpoint in the case of tyres with extended mobility.

FIG. 3 presents a third example of maximum speed setpoint to be transmitted to the driver of a vehicle as a function of the measured inflation pressure of one of its tyres and after the detection of an inflation defect.

In this example, the tyre affected by the detection of a leak comprises structural elements allowing it to roll at zero inflation pressure with a speed and a distance that are limited.

When the measured inflation pressure becomes less than the second threshold $p_2$, the maximum setpoint speed transmitted is no longer zero but the speed recommended by the manufacturer of the tyre and is of the order of 80 km/h. The distance that such a tyre can travel at zero pressure is also limited, of the order of 80 km.

The three figures thus indicate two zones, an authorised shaded first zone I and an unauthorised unshaded second zone II.

This method of transmission to the driver of a vehicle of a maximum speed setpoint that changes as a function of the inflation pressure is a useful addition to the methods for early detection of inflation anomalies by giving the driver precise setpoints to be observed to remain safe while allowing him or her to continue rolling outside of the usual pressure range.

This method is particularly advantageous in the case of tyres comprising self-sealant products and autonomous vehicles by greatly limiting the cases of enforced stoppage of the vehicles.

The invention claimed is:

1. A method for processing inflation defects of a tire of a vehicle, the tire being equipped with sensors for measuring a pressure and a temperature of an internal cavity of the tire, the method comprising the steps of:
   periodically measuring the pressure and temperature of the internal cavity of the tire;
   detecting an inflation defect of the tire, the inflation defect being indictive of a leak;
   signaling, as soon as the inflation defect of the tire is detected, an alert to a driver of the vehicle; and
   transmitting a maximum speed setpoint to the driver,
   wherein the maximum speed setpoint, when the measured inflation pressure of the tire is greater than or equal to a first pressure threshold value p1, is a first maximum speed setpoint value V1, and
   wherein the maximum speed setpoint, when the measured inflation pressure of the tire is less than the first pressure threshold value p1 and greater than or equal to a second pressure threshold value p2, is a function of the measured inflation pressure of the tire where the maximum speed setpoint decreases with decreasing inflation pressure, the maximum speed setpoint transmitted decreasing progressively between the first maximum speed setpoint value V1 and a second maximum speed setpoint value V2 as a curvilinear function of the measured inflation pressure of the tire.

2. The method according to claim 1, wherein the first maximum speed setpoint value V1 lies between 90 and 130 km/h.

3. The method according to claim 1, wherein, when the measured inflation pressure of the tire is less than the second pressure threshold value p2, the maximum speed setpoint transmitted is zero.

4. The method according to claim 1, wherein the first pressure threshold value p1 is equal to a nominal inflation pressure of the tire when cold.

5. The method according to claim 1, wherein the first pressure threshold value p1 lies between 1.5 and 2.5 bar.

6. The method according to claim 1, wherein the second pressure threshold value p2 lies between an unseating pressure of the tire from a rim of the tire while rolling and the unseating pressure plus 0.3 bar.

7. The method according to claim 1, wherein the second pressure threshold value p2 lies between 0.5 bar and 1 bar.

8. The method according to claim 1, wherein the tire comprises structural elements allowing the tire to roll at zero inflation pressure and having a recommended speed for rolling at zero inflation pressure, and wherein, when the measured inflation pressure is less than the second threshold value p2, the maximum speed setpoint transmitted is the recommended speed.

9. The method according to claim 1, wherein detecting the inflation defect of the tire includes detecting of a loss of pressure.

10. The method according to claim 9, wherein detecting the inflation defect of the tire includes:
periodically recording the measured pressure $p_g$ and the measured temperature $\theta$ of the gas of the internal cavity of the tire;
transforming the measured pressure $p_g$ into absolute pressure $P_g$, the measured temperature $\theta$ into absolute temperature T for each record;
obtaining a series of values from the absolute pressure $P_g$, the absolute temperature T, or a relationship between the absolute pressure $P_g$ and the absolute temperature T for each record; and
detecting a leak when a variation over time of the series of values satisfies a predetermined relationship.

11. The method according to claim 10, wherein the tire has a given nominal inflation pressure value when cold $p_0$, the variation over time being a pressure variation threshold $\Delta p$, the pressure variation threshold $\Delta p$ being between 3% and 7% of the nominal inflation pressure value when cold.

12. The method according to claim 10, further comprising:
calculating a $P_g/T$ ratio for each record, the $P_g/T$ ratio being the ratio of the absolute pressure $P_g$ to the absolute temperature T for each record and the series of values being a series of values of the $P_g/T$ ratio;
performing a linear regression on the series of values of the $P_g/T$ ratio;
calculating the slope of a straight line of the linear regression;
estimating the time needed for the inflation pressure $p_g$ to drop below a critical pressure threshold from the slope of the straight line; and
transmitting the estimated time to the driver of the vehicle.

13. The method according to claim 1, wherein detecting the inflation defect of the tire includes detecting an abnormal rise in temperature.

14. The method according to claim 1, wherein the tire comprises, on its inner wall, a layer of self-sealant product.

15. The method according to claim 1, wherein the vehicle comprises an autonomous driving mode.

16. The method according to claim 1, wherein maximum speed setpoint decreases with decreasing inflation pressure more rapidly in proximity to the first pressure threshold value p1 than the second pressure threshold value p2.

* * * * *